United States Patent
La Russa

[11] 3,940,203
[45] Feb. 24, 1976

[54] IMAGE-FORMING APPARATUS

[75] Inventor: Joseph Anthony La Russa, Yorktown Heights, N.Y.

[73] Assignee: Farrand Optical Co., Inc., Valhalla, N.Y.

[22] Filed: Apr. 1, 1975

[21] Appl. No.: 564,188

[52] U.S. Cl. .............. 350/3.5; 350/147; 350/157; 350/293
[51] Int. Cl.² .................. G02B 5/32; G02B 27/28
[58] Field of Search ........... 350/3.5, 147, 157, 293; 35/12 N

[56] References Cited
UNITED STATES PATENTS
R27,356   5/1972   La Russa .......................... 350/157

OTHER PUBLICATIONS
Singerbox, *IBM Technical Disclosure Bulletin*, Vol. 10, No. 3, Aug. 1967, pp. 267–268.

*Primary Examiner*—Ronald J. Stern
*Attorney, Agent, or Firm*—John L. Downing

[57] ABSTRACT

Apparatus for forming at or closer than infinity an image of a primary image source is disclosed. The apparatus employs a reflection-type holographic analog of a spherical mirror and a birefringent array of optical elements. The primary image source is linearly polarized and made incident upon the holographic mirror analog. The light from the primary image passing through the analog is given a circular polarization by a first quarter-wave plate, and a fraction of this light is reflected by a plane beam-splitting mirror back to the analog where it is collimated and transmitted again through the first quarter-wave plate, beam-splitting mirror, a second quarter wave plate and a second polarizer for viewing by an observer. The remaining fraction of circularly polarized light from the primary image passing through the first quarter-wave plate which is not reflected by the beam-splitting mirror passes through the second quarter-wave plate, which gives that light a linear polarization at a 90° angle to the polarization direction of the second polarizer so that it is blocked from viewing by the observer. Although the holographic analog is produced with monochromatic light, there is no dispersion of the broad band polychromatic image source because the analog acts as a narrow band filter in the apparatus. The use of the holographic analog reduces the bulk of prior art image-forming apparatus and eliminates undesired optical aberrations encountered with the use of curved glass mirrors in prior art apparatus.

6 Claims, 2 Drawing Figures

U.S. Patent  Feb. 24, 1976  3,940,203
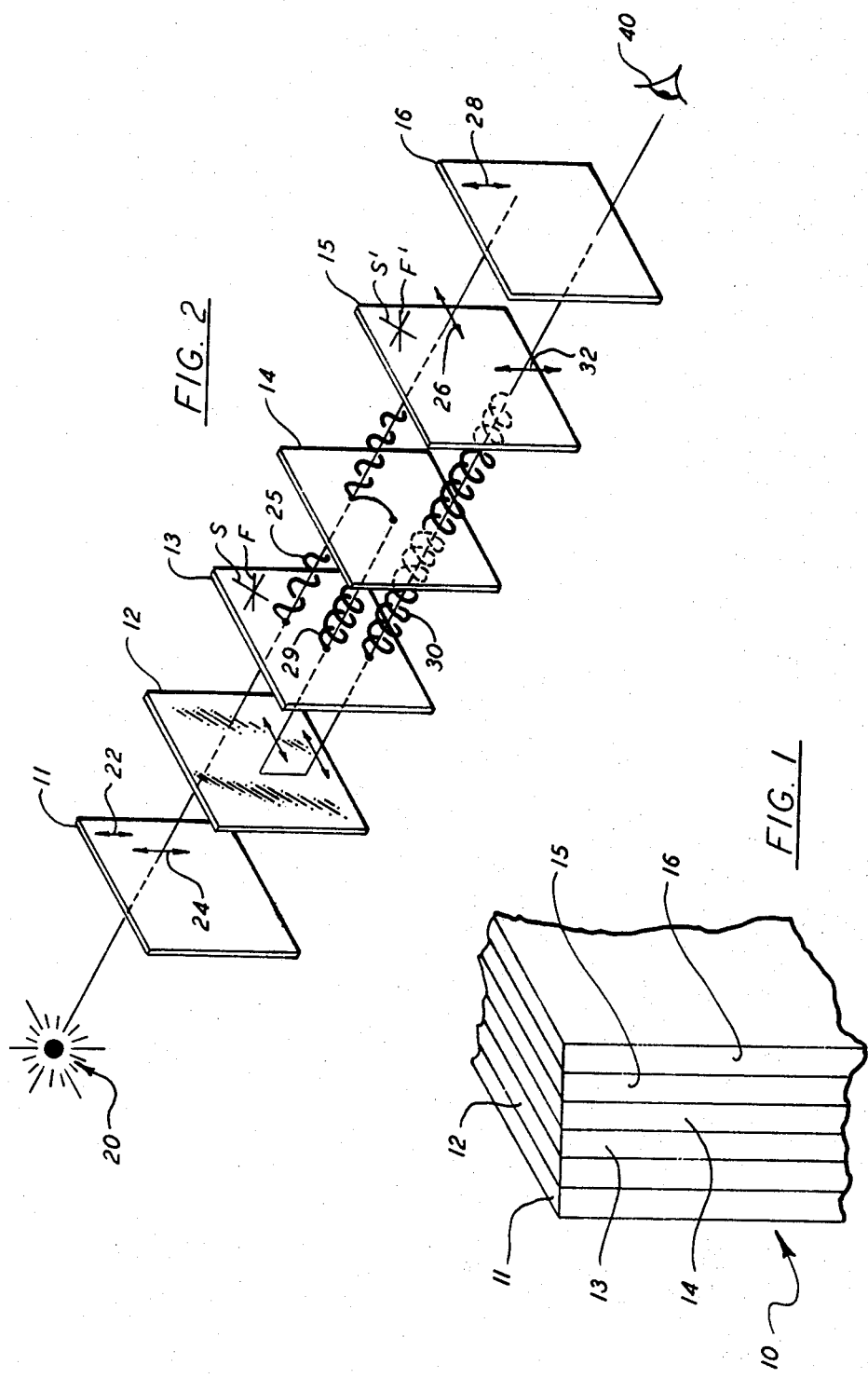

IMAGE-FORMING APPARATUS

FIELD OF THE INVENTION

The present invention relates to image-forming apparatus, and more particularly to improved apparatus for forming, at or closer than infinity, a dispersion-free image of an object using a holographic analog of a curved mirror.

DESCRIPTION OF THE PRIOR ART

In-line infinity display systems capable of forming images at or closer than infinity of an object or a plurality of optically superimposed objects find important application in aircraft flight trainers or spacecraft simulators to provide the user of the trainer or simulator with a realistic "window" for viewing a simulated environment. One such system is described in my U.S. Pat. No. Re. 27,356, reissued May 9, 1972. In that system a single curved, spherical beam-splitting mirror is used as the image-forming element. A primary image is directed at the convex side of the mirror, and a birefringement beam-splitter array positioned on the concave side of the mirror reflects the image back to the spherical mirror which then collimates the image for viewing by an observer. Selective polarization of light prevents the primary image from being seen directly by the observer. The arrangement of that system obviates the use of an oblique beam-splitting mirror across the axis of the spherical mirror so that the optical elements can be assembled into a compact package. Since, with the exception of the curved mirror, all the elements of apparatus are in the form of flat sheets, the assembled package or "window" has a relatively thin cross-section. However, the curved mirror by its nature cannot be reduced to flat sheet form and therefore contributes somewhat to the bulk of the apparatus.

Another limitation of the system described in that patent is the fact that the light rays of the primary image must first pass through the optically significant thickness of the curved glass substrate of the spherical beam-splitting mirror before undergoing collimation. The curved glass substrate acts as a meniscus lens, imparting power to the image and introducing spherical and other optical aberrations to the system.

SUMMARY OF THE INVENTION

The present invention provides an improved image-forming system of the type described in my above-mentioned U.S. Pat. No. Re. 27,356, having a large exit pupil, wide angular field of view, being compact, light in weight and of inexpensive construction. Additionally, the arrangement of the present invention eliminates the increase in apparatus size caused by the inherent sagitta of the curved mirror and also eliminates the optical aberrations caused by the meniscus lens effect of the curved mirror substrate thickness. Both these defects are overcome by replacing the curved mirror of the prior image-forming apparatus with a reflection-type holographic analog of a curved mirror. The use of such a holographic analog with image-forming apparatus of this type was not immediately obvious to me, and in fact I had initially rejected its utility because of the fact, well known to me, that reflection-type holograms, typically produced with monochromatic light, exhibit serious dispersion with broad band illumination (e.g., white light) when viewed in the transmission mode. This property of reflection-type holograms would apparently negate their usefulness in image-forming apparatus of the present type which are invariably used with broad band illumination, since the light rays to be collimated by the holographic analog must first pass through the analog and be dispersed thereby. After having passed through the holographic analog this dispersed illumination is reflected by a plane beam-splitter back toward the collimating holographic mirror analog, and it would be assumed that all the dispersed light rays reflected from the mirror analog would be collimated for viewing by the observer. This dispersion would completely destroy the usefulness of a system of this type.

However, in the course of experimenting with a holographic mirror analog in an in-line infinity display system I discovered that unexpectedly the dispersed illumination, after being reflected from the plane beam-splitter back to the analog, was effectively filtered by the holographic analog. The analog only reflected and collimated the narrow bandwith of illumination preferential to the hologram, and the remaining illumination passed through the analog towards the source of illumination. As a result, the observer viewed a collimated dispersion-free version of the primary image. The holographic mirror acted as a reflection filter, selecting and collimating a narrow band of illumination from the broad band source illumination. And since the holographic analog was in the form of a thin, flat transparent sheet the thickness and bulk of the apparatus package was reduced, and no optical power or aberrations were introduced because of the meniscus lens-like effects of a curved glass mirror.

In summary, the present invention is an image-forming apparatus comprising a reflection-type holographic analog of a curved mirror. A first quarter-wave plate is disposed on the side of the analog corresponding to the concave side of the mirror, and a plane beam-splitting mirror is disposed on the side of the first quarter-wave plate remote from the analog. A second quarter-wave plate is disposed on the side of the beam-splitting mirror remote from the first quarter-wave plate, and a polarizer is disposed on the side of the second quarter-wave plate remote from the beam-splitting mirror. The first and second quarter-wave plates have their fast axes oriented with respect to each other at a first integral multiple of 90°, and the polarizer has its direction of polarization oriented at a second integral multiple of 45° with respect to the fast axis of the second quarter-wave plate. In a preferred embodiment of the invention another polarizer is disposed on the side of the analog corresponding to the convex side of the mirror, the direction of polarization of said other polarizer being oriented 45° with respect to the fast and slow axes of the first quarter-wave plate.

BRIEF DESCRIPTION OF THE DRAWING

FIG. 1 is fragmentary perspective view of a preferred embodiment of image-forming apparatus in accordance with the present invention.

FIG. 2 is an exploded schematic representation of the apparatus shown in FIG. 1 useful in explaining the operation of the invention.

DESCRIPTION OF THE PREFERRED EMBODIMENT

FIG. 1 shows a portion of a preferred embodiment of image-forming apparatus according to the present invention arranged in a package 10 of six optical elements 11–16 each in flat sheet form and stacked together. FIG. 2 shows a view of the elements 11–16 of the package 10 exploded for ease of explanation. Reference numeral 20 identifies a primary image source of unpolarized light. Although the image source 20 is shown as a point in FIG. 2 it is usually an extended source materialized at a diffusing screen.

A first polarizer 11 imposes linear polarization on the light from the source 20 which passes through it. The direction of the polarization of polarizer 11 is identified by a vertical arrow 22, although any other direction can be employed. The resultant polarization of the light passing through the polarizer 11 is indicated by the vertical arrow 24. From the polarizer 11 the linearly polarized light passes through a reflection-type holographic analog 12 of a curved mirror. Typically the analog will be of a concave spherical mirror. Such analogs are well known to those skilled in the art and are made by superimposing a coherent monochromatic "reference" beam of light and a coherent "object" beam of light upon a transparent photosensitive layer to form an interference pattern within the photosensitive layer. The layer is then photographically developed to produce the holographic analog. One particularly effective method for producing holographic analogs of curved mirrors is described in my U.S. Pat. application Ser. No. 445,747, filed Feb. 25, 1974, now abandoned, incorporated herein by reference.

The holographic analog 12 is positioned so that the side of the analog 12 corresponding to the convex side of the curved mirror is facing the polarizer 11. A first quarter-wave plate 13 is disposed on the other side of the analog 12, i.e. on the side corresponding to the concave reflecting side of the mirror. The plate 13 has mutually perpendicular fast and slow axes F and S oriented at 45° to the direction of polarization 22 of the polarizer 11. The linearly polarized light emerging from the quarter-wave plate 13 is circularly polarized, either right or left, depending upon whether the angle between the direction of polarization and the axis F is 45° or −45°. Assuming that the light coming from the plate 13 is right circularly polarized as represented by the helix 25, this light next encounters a plane, partially transmitting and partially reflecting beam-splitting mirror 14, and the fraction of this light passing through the mirror 14 goes on to a second quarter-wave plate 15. The fast and slow axes F' and S' of plate 15 are parallel, respectively, to the corresponding axes of plate 13. The second quarter-wave plate 15 acts to change the right circularly polarized light from the mirror 14 back to linearly polarized light having a direction of polarization oriented at 90° to the direction of polarization 22 of the polarizer 11. This is indicated in FIG. 2 by means of the arrow 26. The linearly polarized light emitted from the second quarter-wave plate 15 is blocked at a second polarizer 16 whose direction of polarization is parallel to that of the first polarizer 11 as indicated by the arrow 28.

The fraction of the circularly polarized light from the first quarter-wave plate 13 which is reflected at the plane beam-splitting mirror 14 is converted by such reflection into circularly polarized light of the opposite rotation, i.e. into left circularly polarized light in the case assumed. This is indicated in FIG. 2 by the left-hand helix 29. In its reflected passage back toward the source 20 this left circularly polarized light again encounters the first quarter-wave plate 13 which transforms it into linearly polarized light with a direction of polarization at 90° with respect to that of the light first polarized at polarizer 11. This linearly polarized light is then partially reflected by the holographic analog 12 of the spherical mirror without change in the orientation of its polarization direction. The light so reflected becomes left circularly polarized in passage through the first quarter-wave plate 13 as indicated by the left-hand helix 30. The fraction of this light which is then transmitted through the beam-splitting mirror 14 is converted by the second quarter-wave plate 15 into linearly polarized light having a polarization direction parallel to the polarization direction of the first polarizer 11 as indicated by the arrow 32. This light accordingly is permitted to pass through the second polarizer 16 and constitutes the only fraction of the unpolarized light from the source 20 which is visible to an observer 40 located on the side of the second polarizer 16 remote from the source 20.

The optical combination of the polarizers 11 and 16, quarter-wave plates 13 and 15, and plane beam-splitting mirror 14 forms a virtual image of the primary image source 20 at or near the principal focus of the holographic analog 12. This virtual image is then imaged in turn at or closer than infinity by that analog. All the elements 11–16 of the apparatus can be assembled in a compact flat package, and neither the object ultimately to be imaged nor any oblique beam-splitting mirror need be disposed in the space between the apparatus and observer.

FIG. 2 shows the apparatus used to form an image of a generalized primary image source 20, but the apparatus can be used to form images of real objects, diffusely radiating images or real aerial images as described in my above-noted U.S. Pat. No. Re. 27,356.

Moreover, although in FIG. 2 the polarizers 11 and 16 have their directions of polarization parallel to each other, and the quarter-wave plates 13 and 15 also have their fast and slow axes respectively parallel to each other, the present invention is not limited to this particular arrangement. If, instead, the polarizers 11 and 16 have their polarization directions perpendicular to each other, and the quarter-wave plates also have their respective corresponding axes crossed, the operation of the apparatus will be essentially the same.

In general, therefore, the two quarter-wave plates 13 and 15 should both have their mutually perpendicular fast and slow axes oriented at substantially ±45° to the direction of polarization of each of the polarizers 11 and 16. The two quarter-wave plates 13 and 15 should have their corresponding axes oriented to each other at an angle which is a first substantially integral multiple of 90° and the two polarizers 11 and 16 should have their directions of polarization oriented to each other at an angle which is a second substantially integral multiple of 90°, both of these multiples being even or both being odd.

The invention is, of course, not limited to the use of holographic analogs of spherical mirrors, and analogs of other forms of curved mirrors can also be employed. And, although the specific embodiment described herein makes use of a first polarizer 11 to linearly polarize the primary image source, it will be understood that such a polarizer will be unnecessary in the present invention if the primary image source is already linearly or circularly polarized.

Finally, the image-forming apparatus has been shown in an arrangement in which the primary image source 20 is made incident upon the side of the analog 12 corresponding to the convex side of the curved mirror and the observer 40 is situated on the other side of the analog 12 and birefringement array of elements 13–16. However, the apparatus of the present invention is equally effective if the positions of the primary source 20 and observer 40 are interchanged.

What is claimed is:

1. Image-forming apparatus comprising:
   a. a reflection-type holographic analog of a curved mirror;
   b. a first quarter-wave plate disposed on a side of of the holographic analog corresponding to the concave side of the mirror;
   c. a plane beam-splitting mirror disposed on the side of the first quarter-wave plate remote from said analog;
   d. a second quarter-wave plate disposed on the side of the beam-splitting mirror remote from said first quarter-wave plate; and
   e. a polarizer on the side of the second quarter-wave plate remote from said beam-splitting mirror; the first and second quarter-wave plates having their fast axes oriented with respect to each other at a first substantially integral multiple of 90°, and the polarizer having its direction of polarization oriented substantially at an odd integral multiple of 45° to the fast axis of the second quarter-wave plate.

2. Image-forming apparatus according to claim 1 further comprising:
   another polarizer disposed on the side of the analog remote from the first quarter-wave plate, the direction of polarization of said polarizer and said other polarizer being oriented with respect to each other at a second substantially integral multiple of 90°, both said first and second multiples of 90° being even or both being odd.

3. Image-forming apparatus according to claim 1 wherein said holographic analog is an analog of a concave spherical mirror.

4. Image-forming apparatus according to claim 1 wherein said analog, quarter-wave plates, plane beam-splitting mirror and polarizer are constituted of flat sheets assembled together in a package.

5. Apparatus for forming at or closer than infinity a dispersion-free image of a polychromatic primary image comprising:
   a reflection-type monochromatic holographic analog of a concave mirror arranged to receive light from said primary image on a side of the analog; and
   optical means associated with said analog for reflecting a fraction of the light transmitted from said primary image through said analog back to the other side of the analog of said mirror for reflection thereby; for transmitting light so reflected to an observer; and for blocking the direct transmission of light transmitted from said primary image through said analog to said observer.

6. Apparatus according to claim 5, said holographic analog acting as a reflection filter, selecting and collimating a narrow band of illumination from said polychromatic primary image.

* * * * *